US008068256B2

(12) United States Patent
Dalal et al.

(10) Patent No.: US 8,068,256 B2
(45) Date of Patent: Nov. 29, 2011

(54) HYPOCHROMATIC IMAGING

(75) Inventors: Edul N. Dalal, Webster, NY (US);
Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 734 days.

(21) Appl. No.: 12/111,267

(22) Filed: Apr. 29, 2008

(65) Prior Publication Data
US 2009/0268218 A1    Oct. 29, 2009

(51) Int. Cl.
*G06F 15/00* (2006.01)
*G06K 1/00* (2006.01)
*H04N 1/60* (2006.01)

(52) U.S. Cl. ........... 358/1.9; 358/2.1; 358/3.1; 358/533; 358/534; 358/535; 382/237

(58) Field of Classification Search ............... 382/306 T, 382/164; 358/306 T
See application file for complete search history.

(56) References Cited

U.S. PATENT DOCUMENTS

| | | | |
|---|---|---|---|
| 5,493,323 A * | 2/1996 | Harrington | 347/251 |
| 5,751,433 A * | 5/1998 | Narendranath et al. | 358/1.9 |
| 5,892,891 A | 4/1999 | Dalal et al. | |
| 6,373,594 B1 * | 4/2002 | Yao et al. | 358/1.9 |
| 6,614,943 B1 * | 9/2003 | Morimatsu et al. | 382/252 |
| 6,643,030 B1 | 11/2003 | Loce et al. | |
| 6,749,284 B2 | 6/2004 | Nagoshi et al. | |
| 6,972,869 B2 * | 12/2005 | Harrington | 358/1.9 |
| 6,985,256 B2 * | 1/2006 | Cheng et al. | 358/1.9 |
| 6,996,358 B2 | 2/2006 | Ayaki et al. | |
| 7,616,349 B2 * | 11/2009 | Vittitoe | 358/3.27 |
| 2001/0024302 A1 * | 9/2001 | Fujita | 358/536 |
| 2003/0020931 A1 | 1/2003 | Harrington | |
| 2003/0185601 A1 | 10/2003 | Toyohara et al. | |
| 2004/0239967 A1 * | 12/2004 | Wen | 358/1.9 |
| 2006/0077468 A1 | 4/2006 | Loce et al. | |
| 2006/0127114 A1 | 6/2006 | Mizuno | |
| 2006/0269127 A1 * | 11/2006 | Ogden et al. | 382/166 |
| 2008/0007785 A1 * | 1/2008 | Hashii et al. | 358/3.01 |
| 2010/0085586 A1 * | 4/2010 | Tin | 358/1.9 |

OTHER PUBLICATIONS

U.S. Appl. No. 11/565,455, filed Nov. 30, 2006, Wang et al.
U.S. Appl. No. 11/565,470, filed Nov. 30, 2006, Wang et al.
Coudray, "Halftone-Angle Combinations for N Color Separation," at screenweb.com/index.php/channel/1/id/41/, 4 pp., (2003).
Wang et al., "Nonorthogonal Halftone Screens," *Proc. NIP18: International Conference on Digital Printing Technologies*, pp. 578-584 (2002).

* cited by examiner

*Primary Examiner* — Charlotte M Baker
*Assistant Examiner* — Aaron R Gerger
(74) *Attorney, Agent, or Firm* — Fay Sharpe LLP

(57) ABSTRACT

Color management constraints on the use of selected hypocolorant(s) and a black colorant in the rendering of a given pixel reduce ink or toner usage and/or reduce pressure on an ink limit. Additionally, the enforcement of this mutual exclusivity between the black and the selected hypocolorant(s) allows screen frequencies and angles to be shared between halftone screens used for the black colorant and a selected hypocolorant. This reduces the likelihood of objectionable moiré associated with the use of hypocolorant colorants in addition to the conventional CMY(K) colorants. In some embodiments, color management constraints prevent the use of black colorant for pixels beyond a threshold lightness or luminance. This constraint allows the use of the selected hypocolorants in the region of color space beyond the threshold. The threshold can be a function of hue and/or chroma. In some embodiments the threshold is a constant.

18 Claims, 9 Drawing Sheets

HYPOCHROMATIC IMAGING

BACKGROUND

The presently disclosed embodiments are directed toward methods and systems related to rendering images with hypochromatic or relatively low chroma colorants in addition to corresponding conventional or relatively higher chroma colorants such as the conventional cyan, magenta, yellow and black colorants. Using hypochromatic colorants, such as light cyan and light magenta in addition to the conventional colorants allow images to be rendered with smoother gradations and reduced texture and visual noise than is possible with conventional colorants alone. Embodiments will be described that reduce colorant consumption and allow for clustered shape halftone screens such as clustered dot and line halftone screens to be used in halftoning more than four separations.

Image rendering technologies are associated with physical restrictions. For example, display devices are limited in the amount of phosphor or the number of light emitting elements that can be included in the given area and/or in the dynamic range of the amount of light that can be produced by such elements. One physical restriction experienced in printing systems is referred to as an ink limit. For example, many electrophotographic or xerographic rendering devices exhibit ink limits of about 240-280%. That is, the print media, such as paper, can typically accept 2.4-2.8 layers of ink or toner. Attempts to apply amounts of colorant beyond the ink limit result in image quality degradation due to retransfer and fusing considerations. This is an issue even in conventional printing systems where there are four colorants and theoretically, it might be desirable to apply three or four layers of colorant (i.e., 300% or 400% inking). This issue is exacerbated when additional colorants, such as a first, second or third hypocolorant (e.g., light cyan, light magenta, and/or grey) is added to the pallette of available inks or toners.

Another issue related to the use of additional colorants is that of halftone screen selection. Each additional halftone screen required to render an image increases the likelihood of the generation of objectionable moiré. Stochastic screens can be used to mitigate this, however, stochastic screens can lead to a noisy or grainy appearance that is inappropriate for the high quality applications typically associated with hypochromatic colorants. Accordingly, clustered shape halftone screens such as, clustered dot or clustered line screens are preferred. However, as indicated above, if clustered screens are not selected carefully, the screens selected for each color separation may interact with one another to create objectionable moiré patterns. While solutions to the moiré issue have been found for the conventional colorants (i.e., CMYK) efforts to find methods for halftoning 5, 6, 7 or more colorants are ongoing. For example, U.S. Pat. No. 5,892,891 to Dalal et al. discusses using the same screen for a hi-fi colorant and its complementary colorant (e.g., cyan and orange). Those techniques are not applicable to hypocolorants. In "Halftone-Angle Combinations for N Color Separations", M. Coudray suggests using the same screen for a lightened colorant and a different conventional colorant (e.g., light magenta and conventional cyan). However, in at least some instances this suggested technique could lead to significant moiré and color shifts for small registration errors between color separations.

Accordingly, there is a desire for color management techniques that are applicable to hypocolorant environments that intelligently use the available ink budget or limit. Additionally, there is a need for halftoning methods that allow for the use of hypocolorants in combination with the conventional colorants while minimizing any aggravation of the moiré issue.

BRIEF DESCRIPTION

A method for preparing to render a color image using a set of at least one hypocolorant in addition to other colorants can include receiving color contone pixel information, generating respective corresponding sets of contone colorant values and storing the generated contone values or using the generated contone values to make marking decisions.

Receiving color contone pixel information includes receiving color contone pixel information describing respective pixel portions of the color image.

Generating respective corresponding sets of contone colorant values can include generating respective corresponding sets of contone colorant values for the respective pixel portions based on the received contone pixel information wherein the set of corresponding contone colorant values is generated in a manner that ensures that, for a selected pixel portion, when a non-zero value is generated in regard to the black colorant, a zero value is generated for each hypocolorant of the set of at least one hypocolorant, and that when a non-zero value is generated in regard to any hypocolorant of the set of at least one hypocolorant, a zero value is generated in regard to a black colorant.

Constraining the color management processes to maintain this mutual exclusivity between the black colorant and at least one selected hypocolorant allows screen frequencies and angles to be shared between a screen selected for halftoning black colorant contone values and a screen selected for halftoning contone values associated with the selected at least one hypocolorant.

Therefore the method can further include selecting a first clustered shape halftone screen, the first clustered shape halftone screen being for use in making marking decisions regarding the black colorant, the first clustered shape screen being characterized, at least in part, by being based on a first set of fundamental halftone screen frequencies and a respective first set of halftone screen directions associated therewith and selecting a second clustered shape halftone screen, the second clustered shape halftone screen being for use in making marking decisions regarding the first hypocolorant of the set of at least one hypocolorant, the second clustered shape halftone screen being characterized, at least in part, by also being based on the first set of fundamental halftone screen frequencies and the respective first set of halftone screen directions associated therewith.

A system that is operative to prepare to render a color image using a set of at least one hypocolorant in addition to other colorants can include a contone value generator that is operative to receive color contone pixel information describing respective pixel portions of the color image and is operative to generate respective corresponding sets of contone colorant values for the respective pixel portions based on the received contone pixel information wherein the sets of corresponding contone colorant values are generated in a manner that ensures that, for a selected pixel portion, when a non-zero value is generated in regard to the black colorant, a zero value is generated for at least a first hypocolorant of the set of at least one hypocolorant, and that when a non-zero value is generated in regard to at least the selected first hypocolorant of the set of at least one hypocolorant, a zero value is generated in regard to a black colorant.

Some embodiment further include a halftone screen assignment mechanism that is operative to select a first clustered shape halftone screen for use in making marking decisions regarding the black colorant, the first clustered shape screen being characterized, at least in part, by being based on a first set of fundamental halftone screen frequencies and a respective first set of halftone screen directions associated therewith and is operative to selecting a second clustered shape halftone screen for use in making marking decisions regarding the first hypocolorant of the set of at least one hypocolorant, the second clustered shape halftone screen being characterized, at least in part, by also being based on the first set of fundamental halftone screen frequencies and the respective first set of halftone screen directions associated therewith.

A halftoner that is operative to halftone colorant values, from the respective sets of contone colorant values received from the storage device or communication mechanism, regarding the black colorant with the first clustered shape halftone screen, thereby making marking decisions regarding the black colorant and is operative to halftone colorant values from the respective sets of contone colorant values regarding the first hypocolorant of the set of at least one hypocolorant with the second clustered shape halftone screen, thereby making marking decisions regarding the first hypocolorant can also be included.

DETAILED DESCRIPTION

Figure 1:
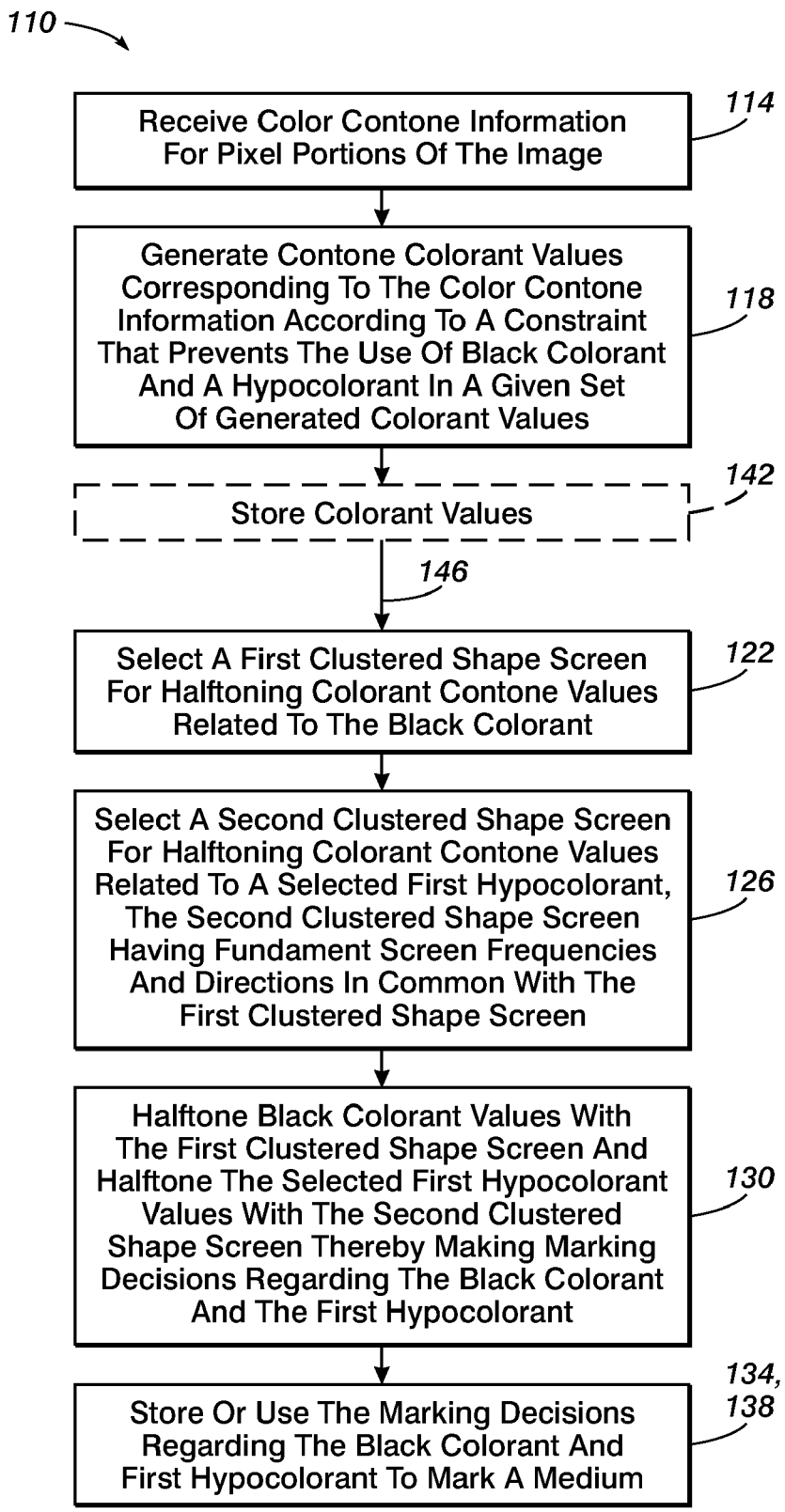
FIG. 1 is a flow chart that outlines methods for preparing to render an image using at least one hypocolorant in conjunction with other colorants.

A method 110 for preparing to render a color image using a set of at least one hypocolorant, in addition to other colorants, can include receiving 114 color contone information for pixel portions of an image and generating 118 contone colorant values corresponding to the color contone information according to a constraint that prevents the use of black colorant and a hypocolorant in a given set of colorant values.

For example, receiving 114 color contone information for pixel portions of an image can include receiving color descriptions in terms of machine independent color descriptions such as L*a*b*, red, green and blue (RGB contone values; cyan, magenta, yellow and optionally black (CMY or CMYK); page description language color descriptions, or other forms of color contone information.)

Generating 118 contone colorant values corresponding to the color contone information according to a constraint that prevents the use of black colorant and a hypocolorant in a given set of colorant values can include generating respective corresponding sets of contone colorant values for respective pixel portions based on the received contone pixel information wherein the set of corresponding colorant contone values is generated in a manner that ensures that, for a selected pixel portion, when a non-zero value is generated in regard to the black colorant, a zero value is generated for at least one selected hypocolorant of the set of at least one hypocolorant. Additionally, following the constraint can include generating contone colorant values in a manner that ensures when a non-zero value is generated in regard to any hypocolorant of the set of at least one hypocolorant, a zero value is generated in regard to the black color.

In some embodiments, this mutual exclusivity constraint between the black colorant and at least one selected hypocolorant is extended to all the hypocolorants that are included in the set of at least one hypocolorant.

Following this color management constraint provides at least two benefits and can be achieved with little or no impact on image quality.

For example, where a prior art system may have transformed received 114 color contone information in a manner that called for colorant values that included non-zero amounts of both black and light cyan colorants, the contone colorant value generation 118 described herein would force the light cyan colorant value to zero and replace the light cyan colorant with a lesser amount of conventional cyan colorant. Additionally, the process might reduce the amount of black colorant called for to compensate for any extra darkness that might be provided by the use of conventional cyan. This intelligent selection of colorants can reduce the amount of colorant required to render a particular pixel portion of an image, thereby conserving the ink budget for use by other colorant separations of the pixel portion.

A second benefit of the method 110 for preparing to render a color image is related to halftoning. Since according to the method 110 contone colorant values are generated in a manner that make the black colorant and at least one selected hypocolorant mutually exclusive, for pixel portions where a selected hypocolorant is to be applied, the black colorant will not be applied. Therefore, the halftone screen selected for the black colorant, or at least the screen frequencies and directions of the screen selected for the black colorant (where the actual thresholds of the black screen selected for the black colorant are not appropriate for the selected hypocolorant) are available for halftoning the selected hypocolorant.

Accordingly, the method 110 for preparing to render a color image with a set of at least one hypocolorant can include selecting 122 a first clustered shape screen for halftoning coloring contone values related to the black colorant, selecting 126 a second clustered shape screen for halftoning colorant contone values related to a selected first hypocolorant, the second clustered shape screen having fundamental screen frequencies and directions in common with the first clustered shape screen, and halftoning 130 black colorant values with the first clustered shape screen and selected first hypocolorant values with the second clustered shape screen, thereby making marking decisions regarding the black colorant and the first hypocolorant.

The marking decisions can be stored 134 or used 138 to mark a medium, such as a print medium (e.g., paper or vellum). Similarly, the generated 118 contone colorant values can be stored 142 prior to or instead of being provided or made available for use in making marking decisions.

Figure 2:
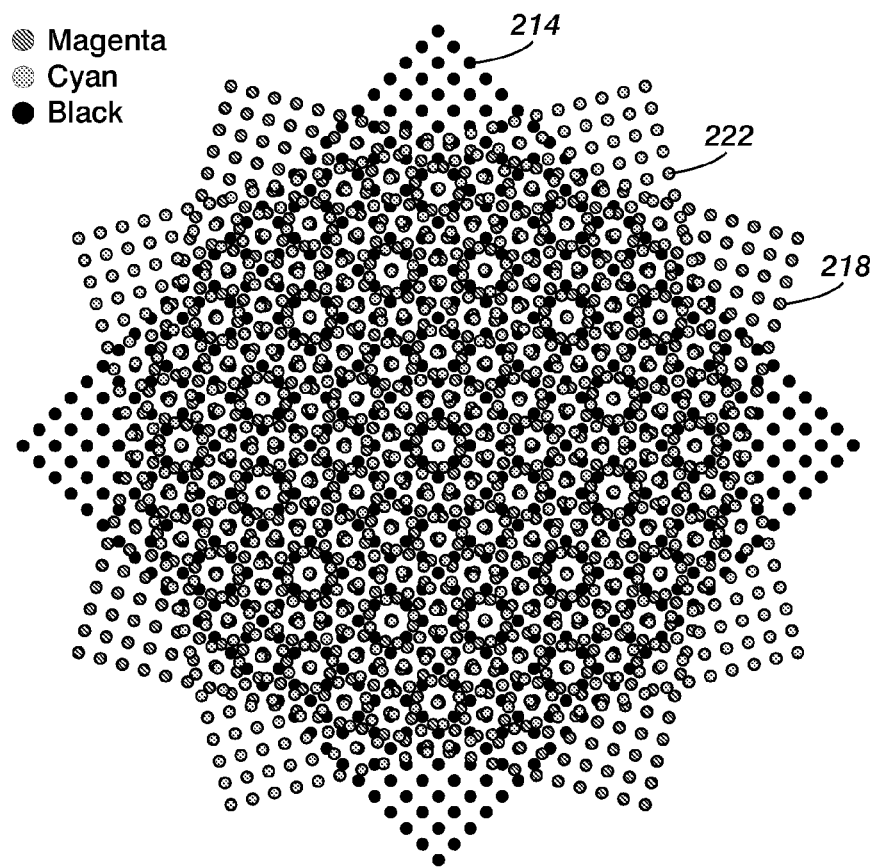
FIG. 2 depicts clustered dot screens.
Figure 3:
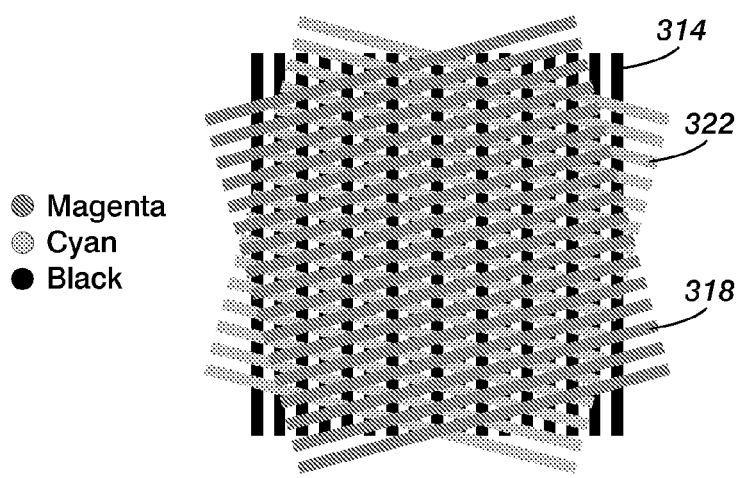
FIG. 3 depicts clustered line screens.

Selecting 122 the first clustered shape screen for halftoning colorant values related to the black colorant can include selecting the first screen to be compatible with other screens used for halftoning other separations (e.g., cyan, magenta, yellow) to be used in rendering the image. For instance, referring to FIG. 2, the first clustered shape screen may be selected 122 to be a clustered dot screen (e.g., 214) having a screen frequency and orientation angle that combines compatibly with the screen frequencies and orientation angles of second and third clustered dot screens 218, 222 that might be used to halftone colorant values associated with magenta and cyan colorants. Alternatively, with reference to FIG. 3, the first clustered shape screen may be selected 122 to be a first line screen 314 that has a screen frequency and orientation angle that combines pleasingly with second and third line screens 318, 322 that might be used to halftone colorant values associated with magenta and cyan colorants. While orthogonal screens are depicted, a non-orthogonal screen might also be selected 122.

Figures 4, 5:
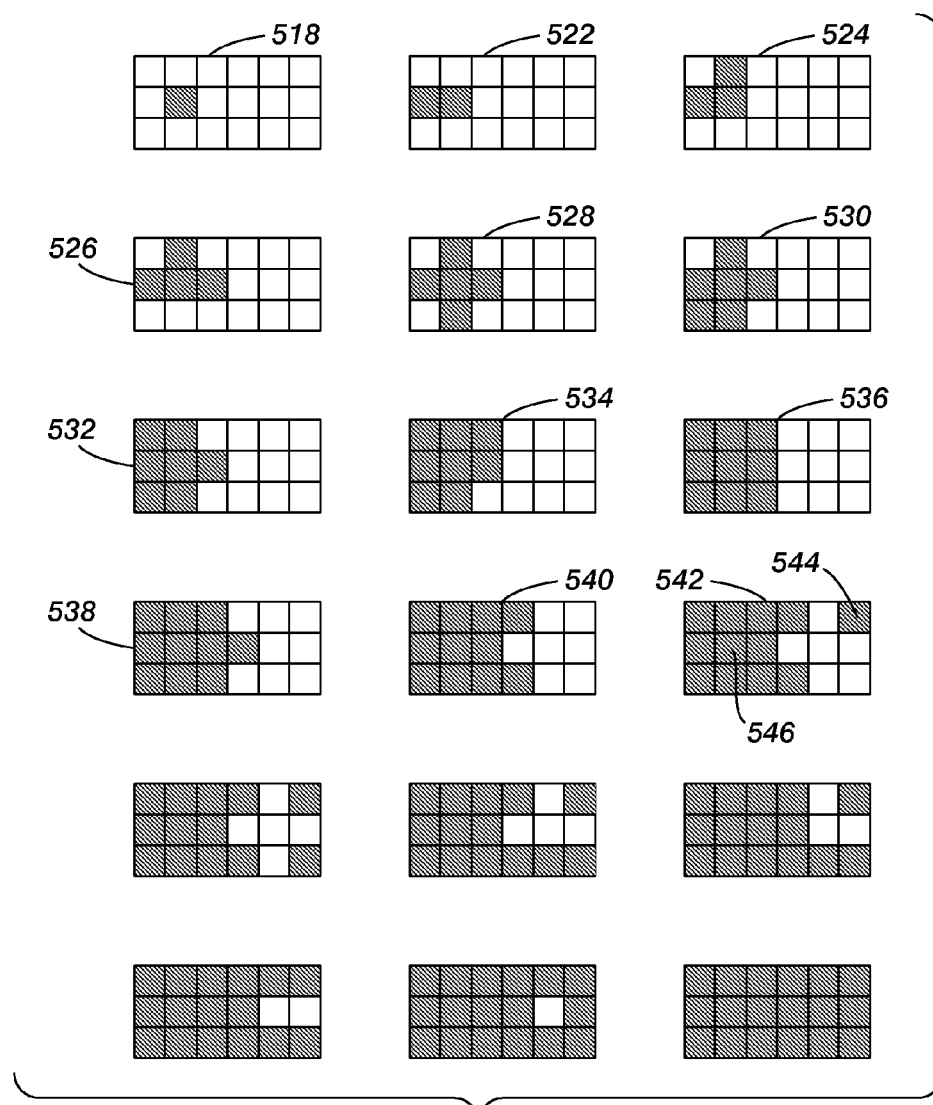
FIG. 4 depicts an arrangement of halftone thresholds arranged in a clustered dot halftone screen cell.
FIG. 5 depicts marking decisions made according to the halftone cell of FIG. 4 as contone values increase.

With reference to FIG. 4 and FIG. 5, as used herein, the phrase—clustered shape screen—refers to that class of halftone screens that are arranged so that as contone values change from light values to dark values marking decisions are made to mark spots in a clustered arrangement. For example, in an illustrative clustered dot halftone cell 414, a lowest value threshold is associated with a spot location 418 that is surrounded by neighboring spot locations 422-436. These neighboring spot locations 422-436 are associated with the second through ninth highest thresholds associated with the cell 414. Accordingly, as depicted in FIG. 5, as the cell is used to halftone progressively darker contone values, decisions are made to mark progressively more spots in a clustered manner. For example, if all of the spots associated with the cell are used to halftone a contone value of 20, then marking decisions are made such that only a single spot associated with the cell is marked (as depicted at 518). If the cell were used to halftone contone values above the threshold value of 28 but below the threshold value of 42 then, as depicted at 522, two adjacent spots would be marked. If the cell 414 were used to halftone contone values above 42, but below 56 then three spots clustered together as depicted at 524 would be marked. As depicted at 526-540, as the halftone cell 414 is used to halftone higher (or darker) contone values marking decisions are made to mark more spots and a cluster of marked spots grows larger. At 542 the decision to mark a spot 544 that is spaced from the main cluster 546 is depicted. In this regard, it is noted that the cell 414 is designed to be incorporated in a screen that is made up of a plurality of such cells. Accordingly, the depicted cell is oriented adjacent to other similar cells. Additionally, it is assumed that the contone values that are halftoned by one cell are similar to the contone values that will be halftoned according to an adjacent cell. That is, it is assumed that sharp edges occur only rarely in images that are to be halftoned. Therefore, the color or shade associated with one halftone cell will be similar to the color or shade associated with an adjacent halftone cell and will be represented by similar halftone values. Accordingly, if a decision is made to mark a spot as depicted at 544 adjacent spots associated with adjacent halftone cells will also be marked. For example, it is assumed that a cell to the immediate right of the spot depicted at 544 will be marked in a manner similar to those shown at, for example, 532-542. Accordingly, the mark depicted at 544 will be clustered with marks of adjacent cells.

Similar principles are applied in the design and arrangement of thresholds in clustered line screens (e.g., FIG. 3) and screens based on other clustered shapes.

The phrases—non clustered shape screen—or—non clustered shape halftone screen—are meant to refer to all halftone screens and halftoning techniques that do not necessarily exhibit or are not designed to exhibit such clustering.

Figure 6:
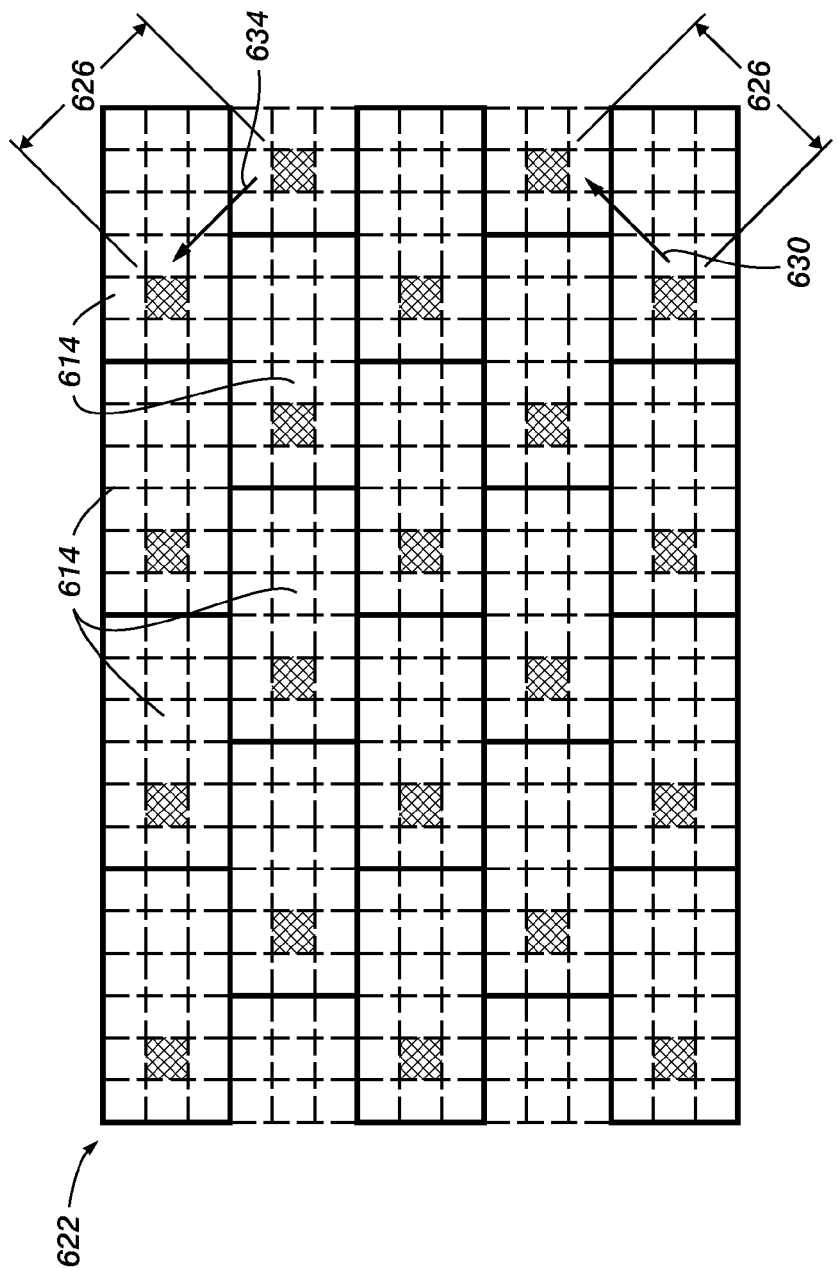
FIG. 6 depicts a halftone screen fragment and aspects thereof.

With reference to FIG. 6, as indicated above, a halftone screen is made up of a plurality of halftone cells such as the cells 614 depicted in the illustrative screen fragment 622. A distance between corresponding portions of adjacent cells is a period of the screen. The shortest such distance (e.g., 626) is a fundamental period in associated screen period directions (e.g., 630, 634). Such directions can be measured from a standard or reference direction (e.g., the horizontal) and are therefore referred to as screen angles or directions.

Accordingly, as indicated above, selecting 122 the first clustered shape screen includes selecting a first clustered shape screen that can be characterized, at least in part, by being based on a first set of fundamental screen frequencies and a respective first set of halftone screen directions.

Since according to the method 110 for preparing to render a color image using a set of at least one hypocolorant in addition to other colorants contone colorant values are generated 118 in a manner that ensures that, for a selected pixel portion, when a non-zero value is generated in regard to the black colorant, a zero value is generated for at least a selected hypocolorant of the set of at least one hypocolorant, and that when a non-zero value is generated in regard to at least the selected hypocolorant a zero value is generated in regard to the black colorant, the screen selected 126 for halftoning values of the selected hypocolorant can have the same screen frequency and screen angle or direction as the first selected 122 clustered shaped screen without risking overlapping marks. Furthermore, since screen combinations including screens for halftoning black colorants in combination with conventional colorants (e.g., cyan, magenta and yellow) that do not generate objectionable moiré are known, using the screen directions and frequencies of an appropriately selected 122 black colorant halftoning screen for a screen used to halftone the selected first hypocolorant will also not generate objectionable moiré. Therefore, as indicated above, selecting 126 a second clustered shape screen for halftoning colorant contone values related to the selected first hypocolorant can include selecting the second clustered shape screen to have fundamental screen frequencies and directions in common with the first selected 122 clustered shape screen.

Since the colorant values generated 118 for a given pixel portion do not include non-zero colorant values for both the black colorant and at least the first selected hypocolorant, halftoning 130 black colorant values with the first clustered shape screen and halftoning 130 the selected first hypocolorant values with the second clustered shape screen includes halftoning black and first hypocolorant contone values associated with different pixel portions.

Colorant values associated with other colorants (e.g., cyan, magenta, yellow) may also be halftoned with halftone screens selected for the purpose.

Figure 7:
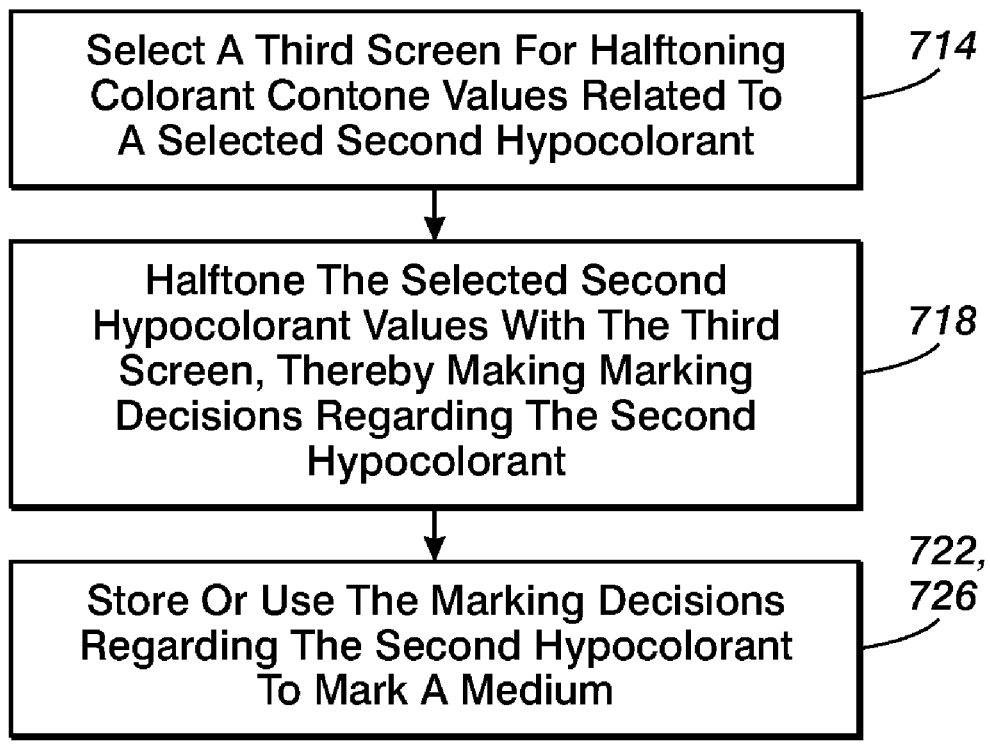
FIG. 7 is a flow chart that outlines aspects of some embodiments of methods of FIG. 1.

Furthermore, with reference to FIG. 7, since the method 110 for preparing to render a color image using at least one hypocolorant provides for the first hypocolorant separation to be rendered without further distortion or added moiré and without further consumption of the ink or colorant budget, some embodiments may include selecting 714 a third screen for halftoning colorant contone values related to a selected second hypocolorant and halftoning 718 the selected second hypocolorant values with the third screen, thereby making marking decisions regarding the second hypocolorant. As before, the marking decisions may be stored 722 or used 726 to mark a medium.

Known or yet to be disclosed techniques may be used to select 714 the third screen for halftoning colorant contone values related to the second hypocolorant. For example, if avoiding moiré is an important goal, a stochastic screen or other non clustered shape screen or halftoning technique (e.g. error diffusion) might be selected for halftoning the second hypocolorant (i.e., the sixth colorant to be included in the rendered image). Alternatively, since the sixth colorant is a light or hypocolorant, screen selection techniques that are normally applied to the selection of halftone screens for halftoning yellow separations may be applied to the selection 714 of the screen for the second hypocolorant. That is, a screen might be selected even though it may generate some moiré when combined with the other selected screens because the second hypocolorant is a light colorant and difficult to perceive. Therefore, in some applications or embodiments any moiré associated with the screen selected for the sixth colorant (i.e., second hypocolorant) will be difficult to perceive.

Figure 8:
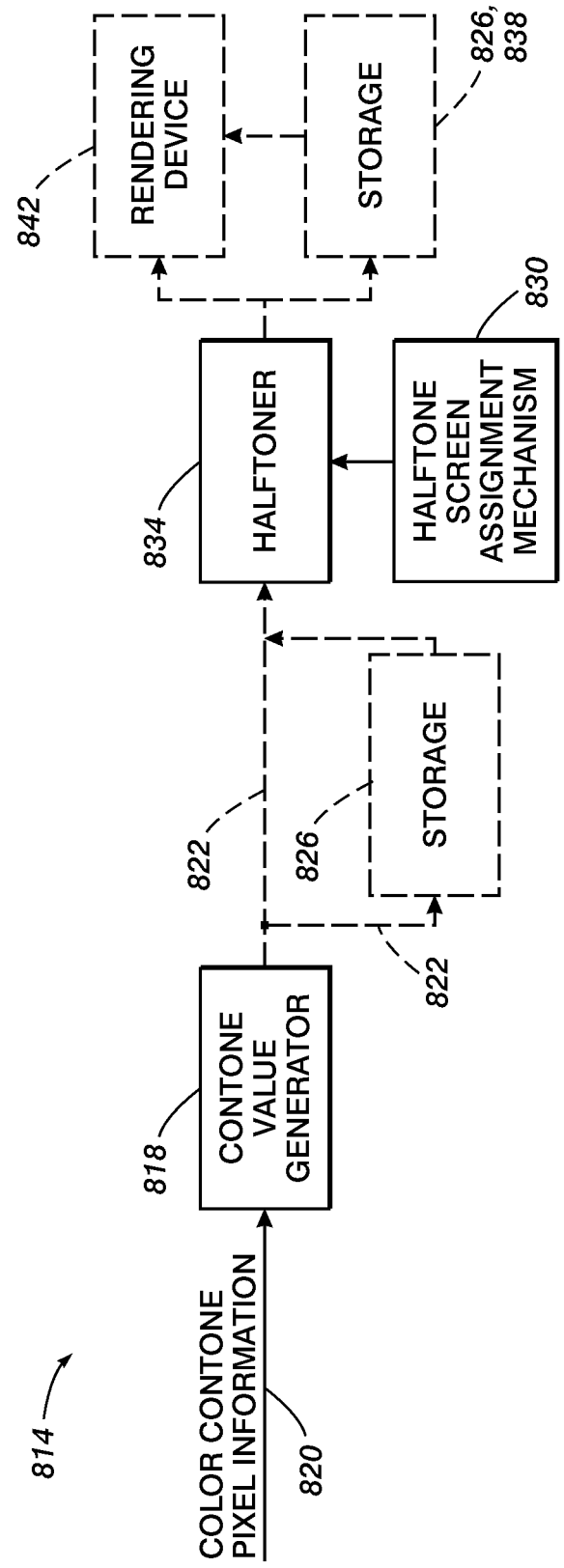
FIG. 8 is a block diagram outlining a system that is operative to perform methods of FIG. 1.

Referring to FIG. 8, a system 814 that is operative to prepare to render a color image using a set of at least one hypocolorant in addition to other colorants can include a contone value generator 818, a communications mechanism 822 and/or a storage device 826.

For instance, the contone value generator 818 is operative to receive 114 color contone pixel information 820 describing respective pixel portions of the color image and to generate 118 respective corresponding sets of contone colorant values for the respective pixel portions based on the received contone pixel information. The contone value generator 818 generates 118 the sets of corresponding contone colorant values in a manner that ensures that, for a selected pixel portion, when a non-zero value is generated in regard to the black colorant, a zero value is generated for at least a selected hypocolorant of the set of at least one hypocolorant. Additionally, when a non-zero value is generated for the hypocolorant of the set of at least one hypocolorant, a zero value is generated in regard to the black colorant.

In some embodiments, the contone value generator 818 generates contone colorant values in a manner that ensures when a non-zero value is generated in regard to the black colorant, a zero value is generated for each hypocolorant of the set of at least one hypocolorant and that when a non-zero value is generated in regard to any of the hypocolorants of the set of at least one hypocolorant, a zero value is generated in regard to the black colorant.

Furthermore, in some embodiments, this mutual exclusivity is enforced between the black colorant and a selected subset of the set of at least one hypocolorant. For instance, where the set of at least one hypocolorant includes three colorants, in some embodiments, the contone value generator 818 generates contone colorant values in a manner that ensures that for a selected pixel portion, when a non-zero value is generated in regard to the black colorant, a zero value is generated for two selected hypocolorants of the set of at least one hypocolorant, and that when a non-zero value is generated in regard to either of those two selected hypocolorants, a zero value is generated in regard to the black colorant.

The storage mechanism 826 can be any known or later developed computer memory device, mass storage device or computer or communications network element useful for storing information such as the contone values generated by the contone value generator 818. The communications mechanism 822 can be any known or later developed communications mechanism, such as a computer bus, computer or communications network, wireless or optical communications network or system appropriate or useful for communicating data such as the generated 118 contone colorant values.

For instance, the communications mechanism can be used to communicate the generated 118 contone colorant values to the storage device 826 or to some other element.

For instance, in some embodiments the system 814 includes a halftone screen assignment mechanism 830 and a halftoner 834.

For example, the halftone screen assignment mechanism 830 is operative to select 122 a first clustered shape halftone screen for use in making marking decisions regarding the black colorant. As indicated above, the first clustered shape screen is characterized, at least in part, by being based on a first set of fundamental halftone screen frequencies and a respective first set of halftone screen directions associated therewith. The halftone screen assignment mechanism 830 is also operative to select 126 the second clustered shape screen for halftoning colorant contone values related to a selected first type of colorant. As indicated above, the second clustered shape screen can be selected by the halftone screen assignment mechanism 830 to be based on the first set of fundamental halftone screen frequencies and the respective first set of halftone screen directions.

The halftone screen assignment mechanism 830 may also select screens for additional colorants. For example, the halftone screen assignment mechanism may select screens for halftoning separations associated with the other conventional colorants (e.g., cyan, magenta and yellow) and/or for separations associated with additional hypocolorants.

For instance, the halftone screen assignment mechanism 830 can select additional clustered or non-clustered shape screens for halftoning additional hypocolorants. For example, stochastic screening or error diffusion techniques can be applied to second or additional hypocolorant contone values. Alternatively, clustered shape screens can be selected where due to the lightness of the associated hypocolorants related moiré are deemed to be less objectionable than artifacts associated with other halftoning techniques.

Where the halftone screen assignment mechanism is aware of or actually makes screen selections with regard to the conventional colorants used in a particular system, the halftone screen assignment mechanism 830 may select 122 the first clustered shape screen for the black colorant separation to be compatible with the other conventional colorant screens.

The halftone screen assignment mechanism 830 can be implemented at system design time by system designers, at system commissioning by system installers, at run time based on an analysis of particular image or job to be processed.

For example, at system design time system designers may determine one or more sets of halftone screens for a particular embodiment of the system 814 and install those sets of screens into the embodiment of the system for use by the halftoner 834. Alternatively, at system commissioning, system installers may select, configure or install one or more sets of screens that are appropriate for the kinds of images to be processed at the installed location.

Alternatively, a job by job analysis performed by a system operator and/or image analysis software (not shown) may manually, semi-automatically or automatically select or assign screens that are appropriate to both the particular embodiment of the system 814 and the particular images being processed.

The halftoner 834 is operative to halftone colorant values from the respective sets of contone colorant values that are generated 118 by the contone value generator 818 and are received from the storage device 826 or directly from the contone value generator 818 via the communication mechanism 822. The halftoner 834 halftones contone colorant values regarding the black colorant with the selected 122 clustered shape halftone screen, thereby making marking decisions regarding the black colorant. Additionally, the halftone 834 halftones colorant values from the respective sets of colorant content values generated 118 by the contone value generator 818 regarding the first hypocolorant of the set of at least one hypocolorant with the selected 126 second clustered shape halftone screen, thereby making marking decisions regarding the first hypocolorant.

In some embodiments, the halftoner 834 also halftones contone colorant values associated with other colorant separations. For example, the halftoner 834 can halftone colorant values associated with conventional CMY colorant separations and/or second or additional hypocolorants, thereby making marking decisions regarding the additional colorant separations.

The marking decisions may be stored for later use in the storage 826 or in a second storage device 838. For instance, the first storage device 826 may include a second portion for storage of marking decisions. Alternatively, portions of the storage 826 originally used to store contone colorant values may be reused to store marking decisions.

Additionally, or alternatively, the system 814 may include a rendering device 842 such as a display, electric paper, or printer, such as an inkjet, electrophotographic, xerographic, or lithographic printing system or press. In the case of printing presses, the marking decisions can be used to make printing plates or the like.

Figure 9:
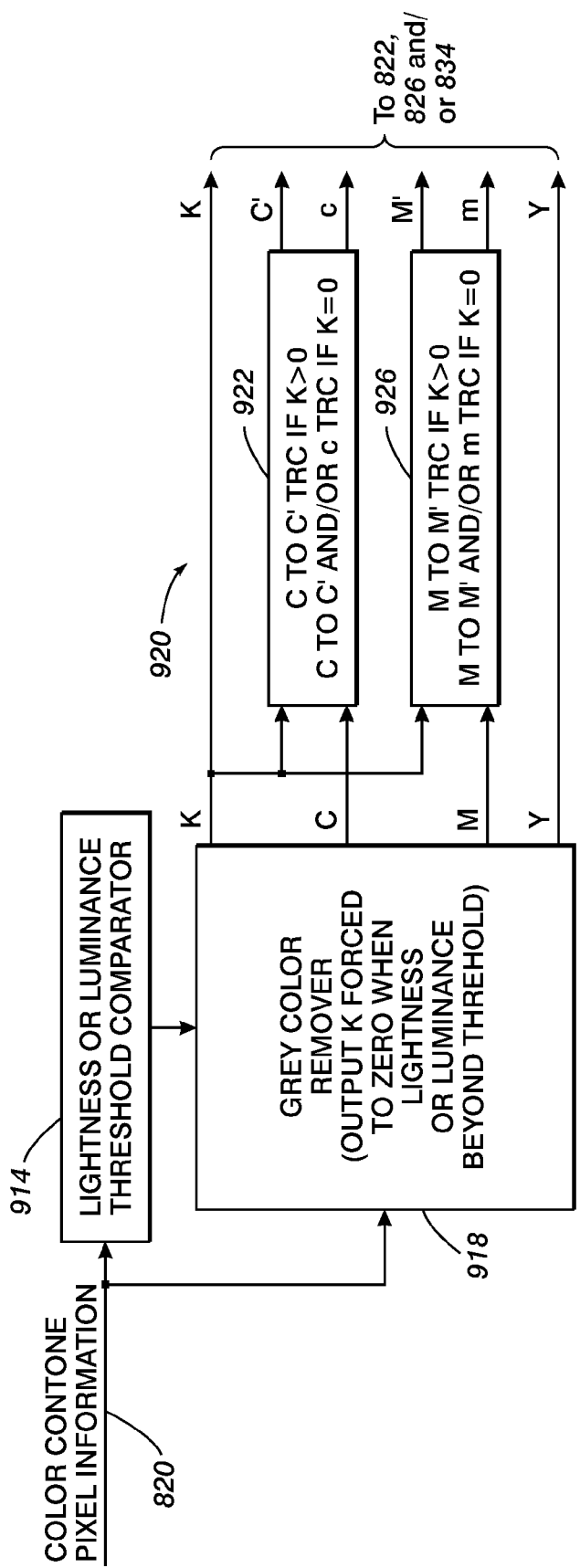
FIG. 9 is a block diagram outlining a first set of embodiments of the contone value generator of FIG. 8.

A variety of contone value generator 818 implementations are possible. For example, referring to FIG. 9, the contone value generator 818 can include a lightness or luminance threshold comparator 914 and a grey color remover 918. The grey color remover stage 918 can be followed buy a colorant value transformer 920 including one or more tone reproduction curves (e.g., 922, 926).

Figure 10:
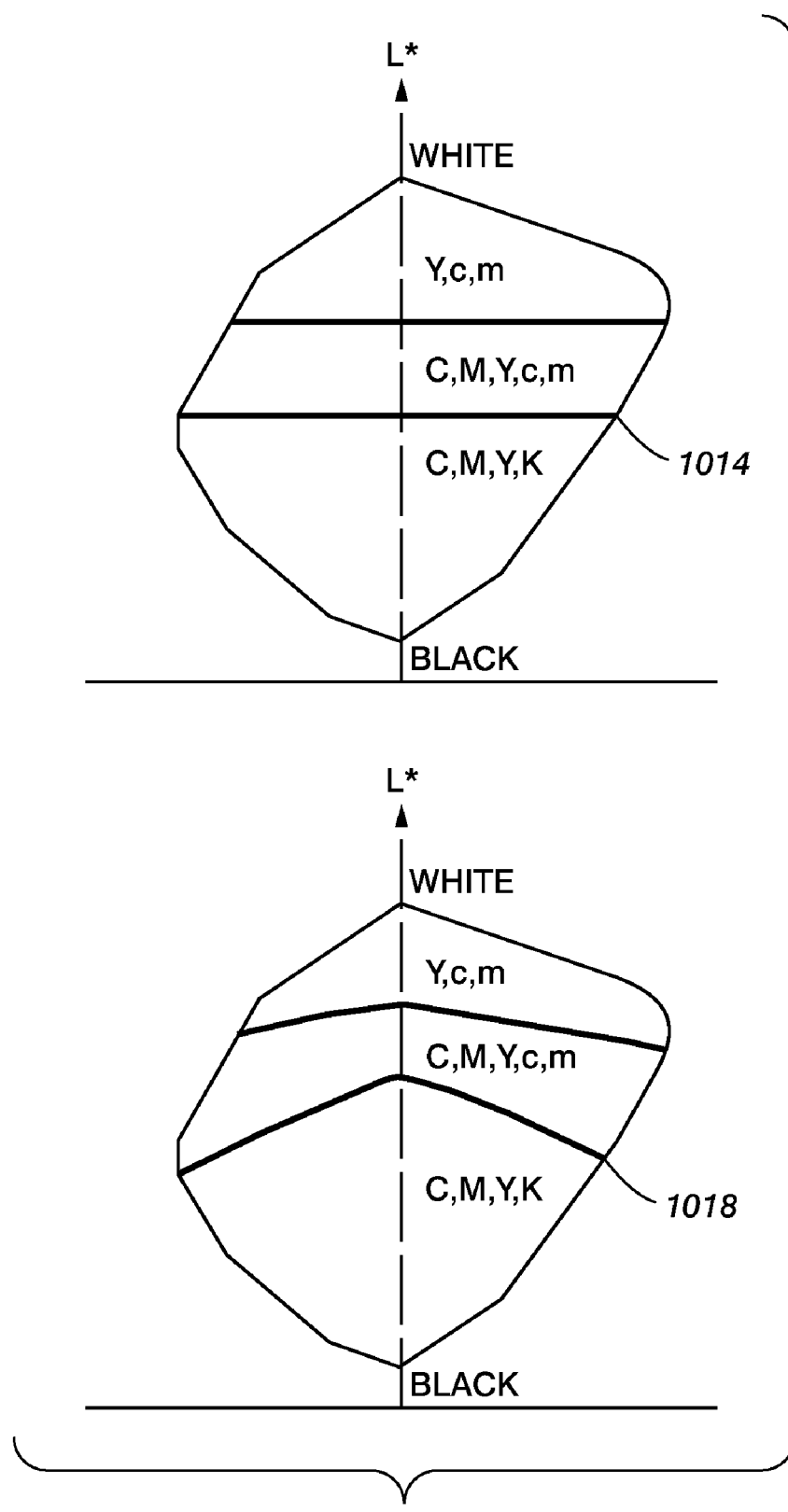
FIG. 10 includes diagrams illustrating thresholds that can be used in the processing of the contone value generator of FIG. 8.

For instance, with reference to FIG. 10, the lightness or luminance threshold comparator 914 can apply a threshold (e.g., 1014, 1018) to received 114 contone color information 820. For instance, the threshold can be a constant threshold based on lightness (e.g., L*) or some similar parameter or metric of the contone color information 820, such as, for example, luminance (e.g., Y). Alternatively, the threshold may be a function 1018 of hue and/or chroma or some other aspect of the contone color information 820.

A result of the comparison can be delivered to the gray color remover 918. The result of the comparison can be used to control the function of the grey color remover. For instance, for lightnesses beyond the threshold (e.g., for lightnesses of input contone color information 820 that describes a color that is lighter than the threshold (e.g., 1014, 1018) value), grayness can be represented by proportional amounts of cyan, magenta, and yellow (CMY) and a contone value associated with the black colorant can be set to zero. For contone color information 820 describing relatively darker colors (e.g., darker than the lightness threshold (e.g., 1014, 1018) some or all of the gray color can be represented in a non-zero contone value associated with the black colorant (K).

The contone value associated with the K colorant can be used as an input to one or more tone reproduction curves (e.g., 922, 926) associated with other conventional colorants that are related to hypocolorants included in system 814. Alternatively, the contone value associated with the K colorant can be used to switch between TRCs.

For instance, the contone value associated with a conventional colorant can be transformed into a conventional contone colorant value (e.g., C transformed to C' or M can be transformed to M') according to a calibration of a target rendering device. Alternatively, the conventional contone colorant value can be transformed to a combination of a conventional contone value and a hypocolorant contone value (e.g., C can be transformed to C' and c; M can be transformed to M' and m).

The contone value associated with the black colorant (K) can be used to select or switch between these kinds of transformations or TRCs. For example, if the contone value associated with K is zero, then it is permissible to use selected hypocolorant(s) (e.g., c and/or m) and TRCs or aspects of TRCs that transform conventional colorant contone values into non zero hypocolorant contone values of the selected hypocolorant(s) may be selected. Alternatively, if a contone value associated with K is non-zero, then transformation of a conventional colorant value into values that include non-zero hypocolorant values regarding the selected hypocolorant(s) is to be prevented and TRCs or portions of TRCs that only transform conventional contone values to other conventional contone values (and/or values of non selected hypocolorant (s)) are selected.

It is noted, that in some embodiments, the output of the lightness or luminance threshold comparator 914 may be used to select or switch between the TRCs or TRC portions, instead of using the contone value associated with K for that purpose.

Figure 11:
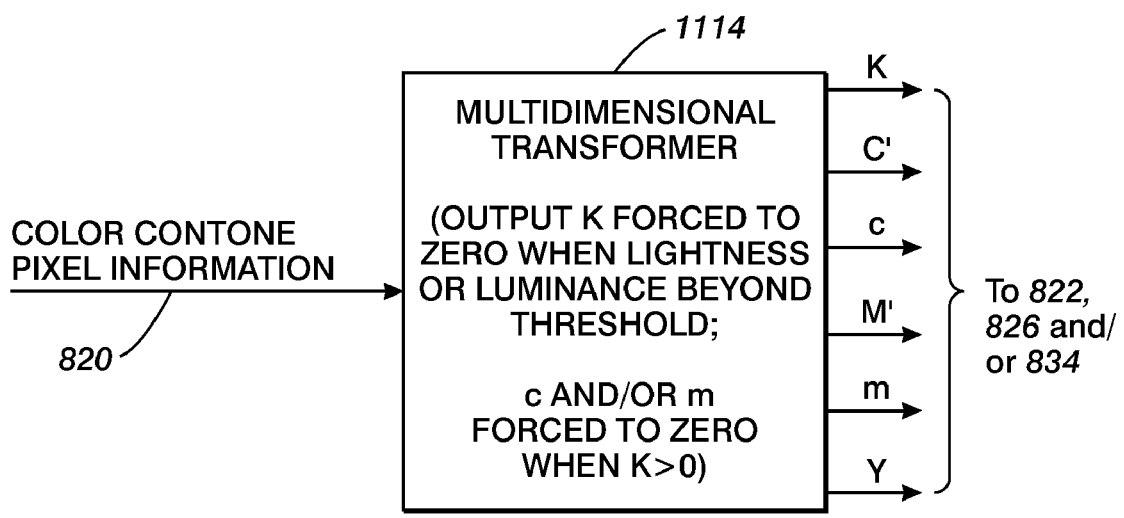
FIG. 11 is a block diagram outlining a second set of embodiments of the contone value generator of FIG. 8.

Alternatively, referring to FIG. 11 in some embodiments, the contone value generator 818 includes a multidimensional transformer 1114. The multidimensional transformer 1114 is operative to process the received color contone pixel information 820 according to a multidimensional transformation that prevents generating a non-zero value regarding the black colorant if the selected one of a lightness or a luminance represented in the received color contone color pixel information 820 is beyond a threshold lightness or luminance level. The threshold can be one of a constant (e.g., 1014) and a function (e.g., 1018) of a hue and/or chroma represented in received contone pixel information 820. The multidimensional transformer 1114 includes transformation information either in the form of a multidimensional lookup table or in the form of a system of one or more equations or functions that generate output similar to the combined effect of the lightness or luminance threshold comparator 914, grey color remover 918 and one or more TRCs (e.g., 922 and/or 926). Accordingly, the multidimensional transformer 1114 outputs a non-zero contone colorant value for the K colorant only if a selected one of a lightness or luminance represented in the received color contone pixel information is beyond a threshold lightness or luminance level and outputs a non-zero value for at least a selected hypocolorant (e.g., c and/or m) only when the contone colorant value associated with the K colorant has a zero value. In some embodiments, the multidimensional transformer 1114 is operative to generate non-zero values regarding only respective non-hypocolorants (e.g., conventional colorants such as CMY) if a non-zero value regarding the black colorant is generated and is operative to generate respective zero and/or non-zero values regarding corresponding hypocolorants and non-hypocolorants, if a zero value is generated with regard to the black colorant.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

The claims can encompass embodiments in hardware, software, or a combination thereof. The phrase "rendering device" as used herein encompasses any apparatus, such as a digital copier, bookmaking machine, facsimile machine, multifunction machine, electric or electronic paper, display device, etc. which performs a print or display output function for any purpose.

The invention claimed is:

1. A method for preparing to render a color image using a set of at least one hypocolorant in addition to other colorants, the method comprising:
   receiving color contone pixel information describing respective pixel portions of the color image;
   generating respective corresponding sets of contone colorant values for the respective pixel portions based on the received contone pixel information wherein the set of corresponding contone colorant values is generated in a manner that ensures that, for a selected pixel portion, when a non-zero value is generated in regard to the black colorant, a zero value is generated for each hypocolorant of the set of at least one hypocolorant, and that when a non-zero value is generated in regard to any hypocolorant of the set of at least one hypocolorant, a zero value is generated in regard to a black colorant;
   at least one of storing the generated respective sets of contone colorant values and providing the respective sets of contone colorant values for use in making marking decisions,
   selecting a first clustered shape halftone screen, the first clustered shape halftone screen being for use in making marking decisions regarding the black colorant, the first clustered shape screen being characterized, at least in part, by being based on a first set of fundamental halftone screen frequencies and a respective first set of halftone screen directions associated therewith;
   selecting a second clustered shape halftone screen, the second clustered shape halftone screen being for use in making marking decisions regarding the first hypocolorant of the set of at least one hypocolorant, the second clustered shape halftone screen being characterized, at least in part, by also being based on the first set of fundamental halftone screen frequencies and the respective first set of halftone screen directions associated therewith;
   halftoning colorant values from the respective sets of contone colorant values regarding the black colorant with the first clustered shape halftone screen, thereby making marking decisions regarding the black colorant;
   halftoning colorant values from the respective sets of contone colorant values regarding the first hypocolorant of the set of at least one hypocolorant with the second clustered shape halftone screen, thereby making marking decisions regarding the first hypocolorant; and
   at least one of storing the marking decisions regarding the black and first hypocolorant and marking a medium according to the marking decisions regarding the black and first hypocolorant.

2. The method of claim 1 further comprising:
   selecting a first non clustered shape halftone screen, the first non clustered shape halftone screen being for use in making marking decisions regarding a second hypocolorant of the set of at least one hypocolorant;
   halftoning colorant values from the respective sets of contone colorant values regarding the second hypocolorant of the set of at least one hypocolorant with the first non clustered shape halftone screen thereby making marking decisions regarding the second hypocolorant; and
   at least one of storing the marking decisions regarding the second hypocolorant and marking a medium according to the marking decisions regarding the second hypocolorant.

3. The method of claim 1 wherein generating the respective corresponding sets of contone colorant values for the respective pixel portions comprises:
   generating the respective corresponding sets of contone colorant values for the respective pixel portions based on the received contone pixel information wherein the set of corresponding contone colorant values is generated in a manner that ensures that, for a selected pixel portion, when a non-zero value is generated in regard to the black colorant, a zero value is generated for at least a selected one of a light cyan and a light magenta colorant, and that when a non-zero value is generated in regard to at least the selected one of the light cyan and the light magenta colorant, a zero value is generated in regard to the black colorant.

4. The method of claim 1 wherein generating the respective corresponding sets of contone colorant values for the respective pixel portions comprises:
   generating the respective corresponding sets of contone colorant values for the respective pixel portions based on the received contone pixel information wherein the set of corresponding contone colorant values is generated in a manner that ensures that, for a selected pixel portion, when a non-zero value is generated in regard to the black colorant a zero value is generated for at least a selected one of light cyan and light magenta colorants and wherein non zero values may be generated for one or more of a cyan, magenta and yellow colorant, and that when a non-zero value is generated in regard to at least the selected one of the light cyan and light magenta colorant a zero value is generated in regard to a black colorant.

5. A system that is operative to prepare to render a color image using a set of at least one hypocolorant in addition to other colorants, the system comprising:
   a contone value generator that is operative to receive color contone pixel information describing respective pixel portions of the color image and is operative to generate respective corresponding sets of contone colorant values for the respective pixel portions based on the received contone pixel information wherein the sets of corresponding contone colorant values are generated in a manner that ensures that, for a selected pixel portion, when a non-zero value is generated in regard to the black colorant, a zero value is generated for each hypocolorant of the set of at least one hypocolorant, and that when a non-zero value is generated in regard to any hypocolorant of the set of at least one hypocolorant, a zero value is generated in regard to a black colorant;
   at least one of a communications mechanism that provides the generated respective sets of contone colorant values for further processing and a storage device that receives the respective sets of contone colorant values and stores the generated respective sets of contone colorant values at least temporarily;
   a halftone screen assignment mechanism that is operative to select a first clustered shape halftone screen for use in making marking decisions regarding the black colorant, the first clustered shape screen being characterized, at least in part, by being based on a first set of fundamental halftone screen frequencies and a respective first set of halftone screen directions associated therewith and being operative to selecting a second clustered shape halftone screen for use in making marking decisions regarding a first hypocolorant of the set of at least one hypocolorant, the second clustered shape halftone screen being characterized, at least in part, by also being based on the first set of fundamental halftone screen frequencies and the respective first set of halftone screen directions associated therewith;

a halftoner that is operative to halftone colorant values, from the respective sets of contone colorant values received from the storage device or communication mechanism, regarding the black colorant with the first clustered shape halftone screen, thereby making marking decisions regarding the black colorant and operative to halftone colorant values from the respective sets of contone colorant values regarding the first hypocolorant of the set of at least one hypocolorant with the second clustered shape halftone screen, thereby making marking decisions regarding the first hypocolorant; and at least one of: a second storage device, or storage device portion, that is operative to store the marking decisions regarding the black and first hypocolorant and a rendering device that operates to mark a medium according to the marking decisions regarding the black and first hypocolorant .

6. A system that is operative to prepare to render a color image using a set of at least one hypocolorant in addition to other colorants, the system comprising:

a contone value generator that is operative to receive color contone pixel information describing respective pixel portions of the color image and is operative to generate respective corresponding sets of contone colorant values for the respective pixel portions based on the received contone pixel information wherein the sets of corresponding contone colorant values are generated in a manner that ensures that, for a selected pixel portion, when a non-zero value is generated in regard to the black colorant, a zero value is generated for each hypocolorant of the set of at least one hypocolorant, and that when a non-zero value is generated in regard to any hypocolorant of the set of at least one hypocolorant, a zero value is generated in regard to a black colorant; and at least one of a communications mechanism that provides the generated respective sets of contone colorant values for further processing and a storage device that receives the respective sets of contone colorant values and stores the generated respective sets of contone colorant values at least temporarily;

wherein the contone value generator comprises:

a gray color replacer that is operative to process the received color contone pixel information to produce intermediate colorant values, wherein the gray color replacement process includes a constraint that prevents generating a non-zero value regarding the black colorant if a selected one of a lightness or luminance represented in the received color contone pixel information is beyond a threshold lightness or luminance level, wherein the threshold is one of a constant and a function of a hue and/or chroma represented in the received contone pixel information; and a colorant transformer that is operative to process the received color contone pixel information according to at least one respective tone reproduction curve that calls for generating non zero values regarding only respective non-hypocolorants if the intermediate colorant values include a non zero value regarding the black colorant and generating respective zero and/or non zero values regarding corresponding hypocolorants and non hypocolorants, if the intermediate colorant values include a zero value with regard to the black colorant.

7. A system that is operative to prepare to render a color image using a set of at least one hypocolorant in addition to other colorants the system comprising:

a contone value generator that is operative to receive color contone pixel information describing respective pixel portions of the color image and is operative to generate respective corresponding sets of contone colorant values for the respective pixel portions based on the received contone pixel information wherein the sets of corresponding contone colorant values are generated in a manner that ensures that, for a selected pixel portion, when a non-zero value is generated in regard to the black colorant, a zero value is generated for each hypocolorant of the set of at least one hypocolorant, and that when a non-zero value is generated in regard to any hypocolorant of the set of at least one hypocolorant, a zero value is generated in regard to a black colorant; and at least one of a communications mechanism that provides the generated respective sets of contone colorant values for further processing and a storage device that receives the respective sets of contone colorant values and stores the generated respective sets of contone colorant values at least temporarily;

wherein the contone value generator comprises:

a multidimensional transformer that is operative to process the received color contone pixel information according to a multidimensional transformation that prevents generating a non-zero value regarding the black colorant if a selected one of a lightness or luminance represented in the received color contone pixel information is beyond a threshold lightness or luminance level, wherein the threshold is one of a constant and a function of a hue and/or chroma represented in the received contone pixel information and is operative to generate non zero values regarding only respective non-hypocolorants if a non zero value regarding the black colorant is generated and is operative to generate respective zero and/or non zero values regarding corresponding hypocolorants and non hypocolorants, if a zero value with regard to the black colorant is generated.

8. The system of claim 5 wherein the halftone screen assignment mechanism is operative to select a first non clustered shape halftone screen for use in making marking decisions regarding a second hypocolorant of the set of at least one hypocolorant, wherein the halftoner is further operative to halftone colorant values from the respective sets of contone colorant values regarding the second hypocolorant of the set of at least one hypocolorant with the first non clustered shape halftone screen thereby making marking decisions regarding the second hypocolorant; and wherein at least one of the second storage device, or storage device portion, is operative to store the marking decisions regarding the second hypocolorant and the rendering device is operative to mark the medium according to the marking decisions regarding the second hypocolorant .

9. The system of claim 5 wherein the contone value generator generates the respective corresponding sets of contone colorant values for the respective pixel portions based on the received contone pixel information in a manner that ensures that, for a selected pixel portion, when a non-zero value is generated in regard to the black colorant, a zero value is generated for at least a selected one of a light cyan and light magenta colorant, and that when a non-zero value is generated in regard to at least the selected one of the light cyan and light magenta colorant, a zero value is generated in regard to the black colorant.

10. The system of claim 5 wherein the contone value generator generates the respective corresponding sets of contone colorant values for the respective pixel portions based on the received contone pixel information in a manner that ensures that, for a selected pixel portion, when a non-zero value is generated in regard to the black colorant, a zero value is generated for at least a selected one of a light cyan and a light magenta colorant, and wherein non zero values may be generated for one or more of a cyan, magenta and yellow colorant, and that when a non-zero value is generated in regard to at least the selected one of the light cyan and light magenta colorant, a zero value is generated in regard to a black colorant.

11. A system that is operative to prepare to render a color image using a set of at least one hypocolorant in addition to other colorants, the system comprising:
a contone value generator that is operative to receive color contone pixel information describing respective pixel portions of the color image and is operative to generate respective corresponding sets of contone colorant values for the respective pixel portions based on the received contone pixel information wherein the sets of corresponding contone colorant values are generated in a manner that ensures that, for a selected pixel portion, when a non-zero value is generated in regard to the black colorant, a zero value is generated for at least a first selected hypocolorant of the set of at least one hypocolorant, and that when a non-zero value is generated in regard to at least the first selected hypocolorant of the set of at least one hypocolorant, a zero value is generated in regard to a black colorant;
a halftone screen assignment mechanism that is operative to select a first clustered shape halftone screen for use in making marking decisions regarding the black colorant, the first clustered shape screen being characterized, at least in part, by being based on a first set of fundamental halftone screen frequencies and a respective first set of halftone screen directions associated therewith and is operative to selecting a second clustered shape halftone screen for use in making marking decisions regarding at least the first selected hypocolorant of the set of at least one hypocolorant, the second clustered shape halftone screen being characterized, at least in part, by also being based on the first set of fundamental halftone screen frequencies and the respective first set of halftone screen directions associated therewith;
a halftoner that is operative to halftone colorant values, from the respective sets of contone colorant values received from the contone value generator, regarding the black colorant with the first clustered shape halftone screen, thereby making marking decisions regarding the black colorant and is operative to halftone colorant values from the respective sets of contone colorant values regarding at least the first selected hypocolorant of the set of at least one hypocolorant with the second clustered shape halftone screen, thereby making marking decisions regarding at least the first selected hypocolorant; and
at least one of a storage device or portion that is operative to store the marking decisions regarding the black and at least the first selected hypocolorant and a rendering device that operates to mark a medium according to the marking decisions regarding the black and at least the first selected hypocolorant.

12. The system claim 11 wherein the contone value generator comprises:
a gray color replacer that is operative to process the received color contone pixel information to produce intermediate colorant values, wherein the gray color replacement process includes a constraint that prevents generating a non-zero value regarding the black colorant if a selected one of a lightness or luminance represented in the received color contone pixel information is beyond a threshold lightness or luminance level, wherein the threshold is one of a constant and a function of a hue and/or chroma represented in the received contone pixel information; and
a colorant value transformer that is operative to process the intermediate colorant values according to respective tone reproduction curves that call for generating a zero value regarding at least the first selected hypocolorant and generating zero and/or non zero values regarding respective non-hypocolorants and hypocolorants other than at least the first selected hypocolorant if the intermediate colorant values include a non zero value regarding the black colorant and call for generating zero and/or non zero values regarding corresponding hypocolorants and non-hypocolorants including even at least the first selected hypocolorant, if the intermediate colorant values include a zero value with regard to the black colorant.

13. The system of claim 11 wherein the contone value generator comprises:
a multidimensional transformer that is operative to process the received color contone pixel information according to a multidimensional transformation that prevents generating a non-zero value regarding the black colorant if a selected one of a lightness or luminance represented in the received color contone pixel information is beyond a threshold lightness or luminance level, wherein the threshold is one of a constant and a function of a hue and/or chroma represented in the received contone pixel information and is operative to generate a zero value regarding at least the first selected hypocolorant and generate zero and/or non zero values regarding only respective non-hypocolorants and colorants other than at least the first selected hypocolorant if a non zero value regarding the black colorant is generated and is operative to generate respective zero and/or non zero values regarding corresponding hypocolorants and non hypocolorants including even at least the first selected hypocolorant, if a zero value with regard to the black colorant is generated.

14. The system of claim 11 wherein the halftone screen assignment mechanism is operative to selecting a first non clustered shape halftone screen for use in making marking decisions regarding a second hypocolorant of the set of at least one hypocolorant, wherein the halftoner is further operative to halftone colorant values from the respective sets of contone colorant values regarding the second hypocolorant of the set of at least one hypocolorant with the first non clustered shape halftone screen, thereby making marking decisions regarding the second hypocolorant; and wherein at least one of the storage device is operative to store the marking decisions regarding the second hypocolorant and the rendering device is operative to mark the medium according to the marking decisions regarding the second hypocolorant .

15. The system of claim 11 wherein the contone value generator generates respective corresponding sets of contone colorant values for the respective pixel portions based on the received contone pixel information wherein the set of corresponding contone colorant values is generated in a manner that ensures that, for a selected pixel portion, when a non-zero value is generated in regard to the black colorant a zero value is generated for each of the hypocolorants of the set of hypocolorants and that when a non-zero value is generated in regard to any hypocolorant of the set of at least one hypocolorant a zero value is generated in regard to the black colorant.

16. The system of claim 11 wherein the contone value generator generates the respective corresponding sets of contone colorant values for the respective pixel portions based on the received contone pixel information in a manner that ensures that, for a selected pixel portion, when a non-zero value is generated in regard to the black colorant, a zero value is generated for at least a selected one of a light cyan and light magenta colorant, and that when a non-zero value is generated in regard to at least the selected one of the light cyan and a light magenta colorant, a zero value is generated in regard to a black colorant.

17. The system of claim 11 wherein the contone value generator generates the respective corresponding sets of contone colorant values for the respective pixel portions based on the received contone pixel information in a manner that ensures that, for a selected pixel portion, when a non-zero value is generated in regard to the black colorant, a zero value is generated for at least a selected one of a light cyan and a light magenta colorant, and wherein non zero values may be generated for one or more of a cyan, magenta and yellow colorant, and that when a non-zero value is generated in regard to at least the selected one of a light cyan and a light magenta colorant, a zero value is generated in regard to the black colorant.

18. The system of claim 11 wherein the rendering device comprises at least one of an electrostatiographic, electrophotographic, xerographic, ink jet printer and a lithographic printing press.

* * * * *